US010440039B1

United States Patent
Salour et al.

(10) Patent No.: US 10,440,039 B1
(45) Date of Patent: Oct. 8, 2019

(54) DELAYED REPLICATION FOR PROTECTION OF REPLICATED DATABASES

(71) Applicant: 8x8, Inc., San Jose, CA (US)

(72) Inventors: Mehdi Salour, San Jose, CA (US); Raghu Rengarajan, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 0 days.

(21) Appl. No.: 16/018,971

(22) Filed: Jun. 26, 2018

Related U.S. Application Data

(63) Continuation of application No. 14/936,313, filed on Nov. 9, 2015, now Pat. No. 10,021,120.

(51) Int. Cl.
*H04L 29/06* (2006.01)
*G06F 21/62* (2013.01)
*G06F 16/27* (2019.01)
*G06F 21/56* (2013.01)
*G06F 11/14* (2006.01)
*G06F 3/06* (2006.01)

(52) U.S. Cl.
CPC ......... *H04L 63/1416* (2013.01); *G06F 16/27* (2019.01); *G06F 21/6218* (2013.01); *G06F 3/0646* (2013.01); *G06F 11/1461* (2013.01); *G06F 21/56* (2013.01); *G06F 21/566* (2013.01); *G06F 21/568* (2013.01); *G06F 2201/84* (2013.01)

(58) Field of Classification Search
None
See application file for complete search history.

(56) References Cited

U.S. PATENT DOCUMENTS

| 5,608,865 | A | 3/1997 | Midgely et al. |
| 5,870,758 | A * | 2/1999 | Bamford ........... G06F 17/30362 |
| 6,519,679 | B2 | 2/2003 | Devireddy et al. |
| 7,155,466 | B2 | 12/2006 | Rodriguez et al. |
| 7,197,520 | B1 * | 3/2007 | Matthews ........... G06F 11/1458 |

(Continued)

OTHER PUBLICATIONS

"What is Active/Active?", The Availability Digest, pp. 1-5 (Oct. 2006).

(Continued)

*Primary Examiner* — Saleh Najjar
*Assistant Examiner* — Michael W Chao
(74) *Attorney, Agent, or Firm* — Crawford Maunu PLLC

(57) ABSTRACT

Apparatuses and methods are disclosed for protection of data servers configured for data replication of a database. As an example, one apparatus includes at least one processing circuit configured to receive records indicating respective modifications performed on a first version of the database stored in a first data server of the plurality of data servers. The at least one processing circuit is configured to delay replication of the modification in one or more additional servers in the plurality of data servers for a respective length of time specified for the servers in a security profile. While delaying replication of the modification, the processing circuit determines a probability that the modification is malicious based on a first set of factors indicated in a security profile. If the probability is greater than a threshold specified in the security profile, the processing circuit prevents the modification from being performed.

20 Claims, 6 Drawing Sheets

(56) References Cited

U.S. PATENT DOCUMENTS

| | | | |
|---|---|---|---|
| 7,509,468 B1 | 3/2009 | Dalal et al. | |
| 7,613,747 B1* | 11/2009 | Thakur | G06F 11/1456 |
| | | | 707/640 |
| 7,636,872 B2 | 12/2009 | Kramer et al. | |
| 7,784,098 B1 | 8/2010 | Fan et al. | |
| 7,840,992 B1 | 11/2010 | Dufrene et al. | |
| 7,841,008 B1* | 11/2010 | Cole | G06F 21/577 |
| | | | 709/226 |
| 7,934,262 B1* | 4/2011 | Natanzon | G06F 21/564 |
| | | | 707/648 |
| 8,019,723 B2 | 9/2011 | Bish et al. | |
| 8,438,644 B2* | 5/2013 | Watters | G06F 21/577 |
| | | | 705/51 |
| 8,495,037 B1 | 7/2013 | Westenberg | |
| 8,533,818 B1 | 9/2013 | Ketterhagen et al. | |
| 8,578,096 B2 | 11/2013 | Malige et al. | |
| 8,762,341 B1 | 6/2014 | Mahajan et al. | |
| 8,838,529 B2 | 9/2014 | Anglin et al. | |
| 9,122,643 B2* | 9/2015 | Herz | G06F 11/1464 |
| 9,158,630 B1* | 10/2015 | Natanzon | G06F 3/0619 |
| 9,317,686 B1* | 4/2016 | Ye | G06F 11/1461 |
| 9,401,925 B1* | 7/2016 | Guo | H04L 63/1416 |
| 9,582,382 B1* | 2/2017 | Natanzon | G06F 11/00 |
| 9,582,780 B1* | 2/2017 | Curcic | G06Q 10/0635 |
| 9,632,875 B2 | 4/2017 | Raichstein et al. | |
| 9,774,616 B2* | 9/2017 | Flores | H04L 63/1433 |
| 9,804,934 B1* | 10/2017 | Natanzon | G06F 11/1453 |
| 9,811,659 B1* | 11/2017 | Asheghian | G06F 21/552 |
| 10,203,874 B1* | 2/2019 | Duprey | G06F 3/0604 |
| 10,204,021 B2* | 2/2019 | Coronado | G06F 11/2069 |
| 10,261,717 B1* | 4/2019 | Martin | G06F 3/061 |
| 10,311,234 B2* | 6/2019 | Bhashkar | G06F 21/566 |
| 2005/0114411 A1 | 5/2005 | Childs et al. | |
| 2006/0101400 A1 | 5/2006 | Capek et al. | |
| 2006/0218439 A1 | 9/2006 | Carter-Schwendler et al. | |
| 2006/0248084 A1* | 11/2006 | Sack | G06F 21/6227 |
| 2007/0038884 A1 | 2/2007 | Campbell et al. | |
| 2007/0124407 A1 | 5/2007 | Weber et al. | |
| 2007/0168704 A1 | 7/2007 | Connolly et al. | |
| 2008/0195676 A1* | 8/2008 | Lyon | G06F 11/1469 |
| 2009/0016190 A1 | 1/2009 | Jakob | |
| 2009/0089334 A1* | 4/2009 | Mohamed | G06F 16/2282 |
| 2009/0113151 A1 | 4/2009 | Teranishi et al. | |
| 2009/0210427 A1* | 8/2009 | Eidler | G06F 11/1484 |
| 2010/0138639 A1* | 6/2010 | Shah | G06F 21/53 |
| | | | 712/227 |
| 2011/0099609 A1* | 4/2011 | Malhotra | G06F 21/53 |
| | | | 726/4 |
| 2011/0145926 A1 | 6/2011 | Dalcher et al. | |
| 2011/0191299 A1 | 8/2011 | Huynh Huu et al. | |
| 2011/0289584 A1* | 11/2011 | Palagummi | G06F 21/562 |
| | | | 726/24 |
| 2012/0124007 A1 | 5/2012 | Sten et al. | |
| 2012/0167219 A1 | 6/2012 | Zaitsev et al. | |
| 2013/0347116 A1* | 12/2013 | Flores | H04L 63/1433 |
| | | | 726/25 |
| 2014/0090061 A1 | 3/2014 | Avasarala et al. | |
| 2015/0067860 A1* | 3/2015 | Levow | H04L 63/145 |
| | | | 726/24 |
| 2015/0154271 A1 | 6/2015 | Iwasaki et al. | |
| 2015/0163121 A1* | 6/2015 | Mahaffey | G06F 11/0766 |
| | | | 707/687 |
| 2015/0172304 A1 | 6/2015 | Kleczynski | |
| 2015/0195300 A1* | 7/2015 | Adjaoute | H04L 63/1433 |
| | | | 726/25 |
| 2015/0286437 A1 | 10/2015 | Coronado et al. | |
| 2016/0044054 A1* | 2/2016 | Stiansen | H04L 63/1416 |
| | | | 726/24 |
| 2016/0065594 A1* | 3/2016 | Srivastava | H04L 63/1433 |
| | | | 726/23 |
| 2016/0065627 A1 | 3/2016 | Pearl et al. | |
| 2016/0306967 A1* | 10/2016 | Hart | G06F 21/56 |
| 2016/0378988 A1* | 12/2016 | Bhashkar | G06F 21/566 |
| | | | 726/24 |
| 2017/0034193 A1* | 2/2017 | Schulman | H04L 63/1416 |
| 2017/0161158 A1 | 6/2017 | Boshev | |
| 2018/0082229 A1* | 3/2018 | Fu | G06Q 20/4016 |

OTHER PUBLICATIONS

Jalal Omer Atoum and Amer Jibril Qaralleh. "A Hybrid Technique for SQL Injection Attacks Detection and Prevention." IJDMS, vol. 6(1), pp. 21-28 (Feb. 2014).

* cited by examiner

DELAYED REPLICATION FOR PROTECTION OF REPLICATED DATABASES

OVERVIEW

Computing servers are increasingly being used to provide various services over a network including, but not limited to, website hosting, remote data storage, remote computing services, virtual computing environments, and communication services such as voice-over-IP (VoIP), video conferencing, call exchange servers, and packet switching, and traffic management. Malware (e.g., viruses, worms, Trojan horses, ransomware, spyware, adware, scareware, and other malicious programs) can pose a significant problem in modern computing systems. Malware generally includes computer code configured to perform unsolicited or malicious actions when executed on a computer system. Some malware may significantly disrupt operation of a computing system by modifying (e.g., deleting, replacing, renaming, and/or encrypting) files on a computing system. As one example, malware may be designed to disrupt service provided by a computing server by deleting files stored by a computing server. As another example, an attacker may attempt to encrypt files stored by the computing server in an attempt to acquire a ransom in exchange for a decryption key to restore the files. In some systems, security software is employed to detect malware. Once malware is detected, the software prevents further malicious action by disabling and/or removing the detected malware code. However, disabling or removing the malicious code without also restoring files modified by malware may not restore correct operation of the computer system.

SUMMARY

Various example embodiments are directed to protection of data servers configured for data replication of a database. In an example embodiment, an apparatus includes at least one processing circuit configured to store records indicating respective modifications performed on a first version of the database stored in a first data server of the plurality of data servers. The processing circuit is configured to delay replication of the modification in one or more additional servers in the plurality of data servers for a respective length of time specified for the servers in a security profile. While delaying replication of the modification, the processing circuit determines a probability that the modification is malicious based on a first set of factors indicated in a security profile. If the probability is greater than a threshold specified in the security profile, the processing circuit prevents the modification from being performed on a second version of the database stored in a second data server. Otherwise, the modification is replicated on a second version of the database stored in a second data server after replication has been delayed for a length of time specified for the second server in the security profile.

In another example embodiment, a method is provided for protecting a plurality of data servers configured to provide data replication of a database. A record that specifies a modification performed on a first version of the database stored on a first data server is received. Replication of the modification indicated by the record is delayed in at least a second data server for a length of time specified for the second data server in a security profile. During the length of time in which replication is delayed, a probability is determined that the modification indicated by the record is malicious based on a first set of factors indicated in a security profile. The first set of factors are indicative of anomalous data access activity. Replication of the modification indicated by the record is prevented on a second version of the database stored in the second data server in response to the probability exceeding a threshold level specified in the security profile. After the length of time specified for the second data server in a security profile, the modification indicated by the record is replicated on the second version of the database stored in the second data server in response to the probability being less than or equal to a threshold level specified in the security profile.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
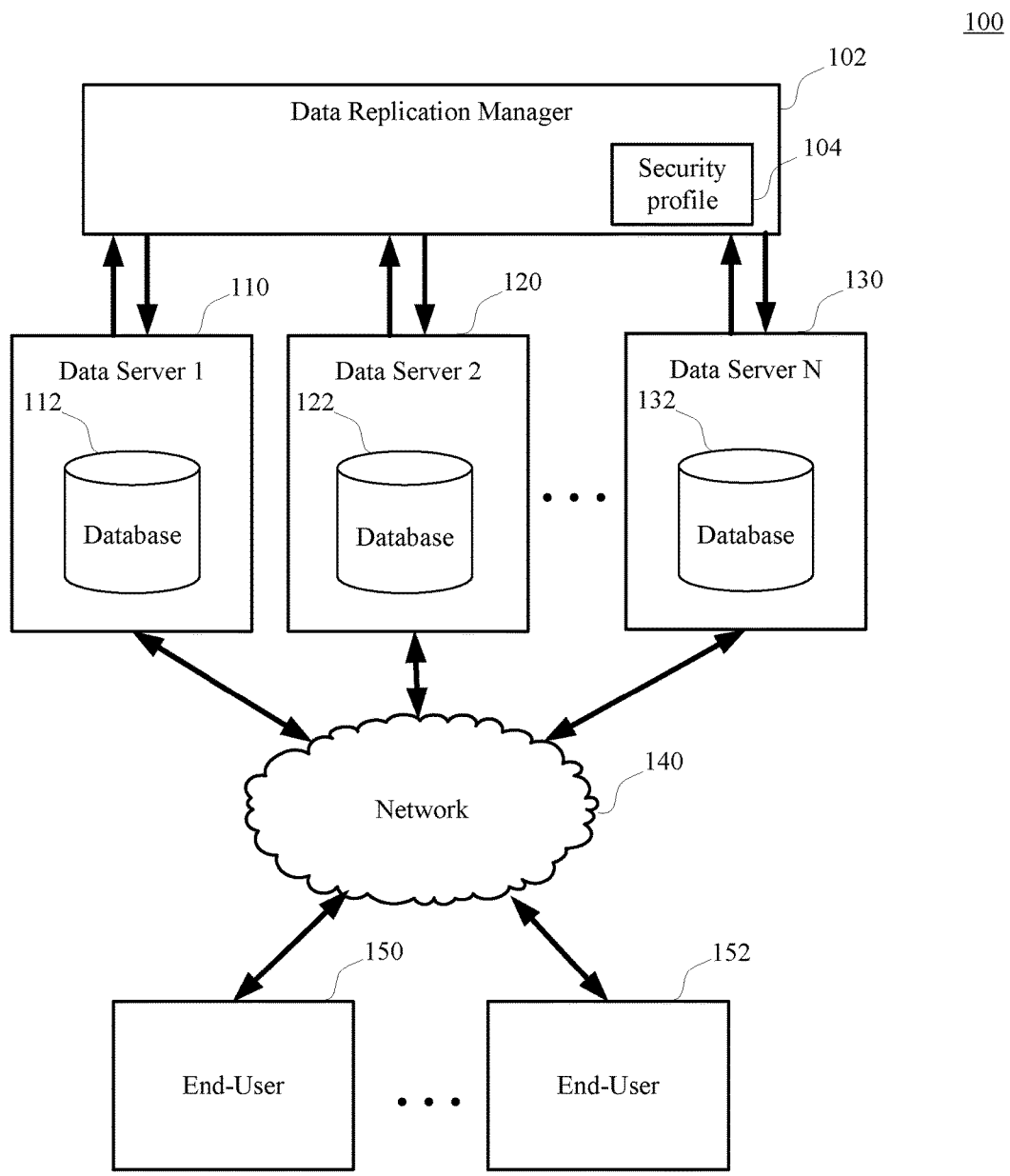
FIG. 1 shows a computing arrangement 100 configured for monitoring replicated data transactions for a common database of a plurality of data servers, consistent with various embodiment of the present disclosure.

While various embodiments discussed herein are amenable to modifications and alternative forms, aspects thereof have been shown by way of example in the drawings and will be described in detail. It should be understood, however, that the intention is not to limit embodiments to the particular implementation described herein. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems, and methods for operation data servers. In certain implementations, aspects of the present disclosure have been shown to be beneficial when used in the context of data replication between servers of a plurality of data servers.

While not necessarily so limited, various aspects may be appreciated through a discussion of examples using such exemplary contexts.

Systems and methods are disclosed for detecting and recovering from malicious data-destructive activity in a computing system. In some embodiments, multiple versions of a database are maintained by respective ones of a plurality of data servers. Data transactions initiated by users may be directed to various ones of the data servers, for example, by traffic management circuit. For instance, a traffic management circuit may direct data transactions to distribute user-traffic load among the data servers and thereby improve performance. Data transactions may specify read operations or modifications (e.g., write or delete) to be performed on the database. Modification performed on the version of the database stored at an initial data servers, to which a data transaction is directed, is repeated on the versions of the database stored at other ones of the data servers (e.g., by a data replication manager). If a data server becomes unavailable, for example, due to network failure, malicious attack, or power failure, data transactions initiated by users may be directed to another one of the data servers thereby facilitating speedy restoration of service to the users. However, in the scenario of a data destructive attack, if destructive modifications are propagated to other data servers, no data server may be available that has an uncorrupted version of the database. For ease of reference, the data server on which a data transaction is initially directed, and the specified modification is initially performed, may be referred to as an initial data server. Other ones of the data servers, in which modifications are to be replicated, may be referred to as secondary data servers.

Consistent with various embodiments, a number of different server nodes can be configured as an active-active system in which the various nodes each have access to database servers that each store a replicated version of a common database. As discussed herein, active-active systems can be configured such that each of the different server nodes can provide access to a common database through one or more applications that shared between the server nodes. End user nodes can access the common database through the server nodes and the common application(s). The data servers can maintain synchronicity so that each of the replicated databases can be used by any copy of the application. In some instances, maintaining synchronicity requires that data transactions be carried out in the same order at each of the databases. There are a number of techniques for maintaining synchronicity. For instance, each transaction can be carried out on the initial database and then asynchronously replicated at the secondary/target databases. In other implementations, transactions are replicated and sent to each database before being carried out so that all transactions are implemented synchronously.

Various embodiments recognize that backup systems can also be used for assisting in recovering data from malicious modifications. For example, a backup system can store snapshots of a system and its database(s) on a storage device. The snapshots can be used to recover specific items of data or entire databases in the event of a problem. It is recognized, however, that merely having access to the raw data is often not sufficient to quickly recovering from a disaster event. Replication solutions, on the other hand, can allow for multiple data servers to be preconfigured in a manner that one is nearly indistinguishable from another, which facilitates quick recover in the event of a failure related to one or more of the data servers. Moreover, backup solutions often do not scale well as they can consume large amounts of computing resources (e.g., processing power and network bandwidth) as the frequency and size of the snapshots increases.

In one or more embodiments, one or more databases can be used as delayed replication databases. The replication databases can be maintained as if they were part of the real time common database, from an active-active configuration, but with a time delay on when the data transactions are carried out relative to the real time common database. In some instances, the delayed databases are not be accessible to the common application of the server nodes during normal operation because they are not synchronized to the real time database. According to embodiments, the delayed databases can be configured with different respective delays. For instance, records of transactions and modifications can be buffered for different lengths of time before they are performed on the versions of the data stored at a one or more secondary data servers. For example, a first secondary data server may operate 6 hours behind the real time/active data servers, a second secondary data server may operate 24 hours behind the real time data servers, a third data server may operate 48 hours behind the real time data servers, and so on. When malicious or inadvertent data transactions are discovered, the system can be configured to take the current active data servers offline and switch users to a delayed data server that has not yet performed the malicious data transactions. In this manner, a system may quickly recover from accidental/non-malicious events without resorting to the lengthy backup/restore procedures/methodologies. The version of the database stored in the secondary data server may also be used to restore the active-active data servers to a previous state before the malicious data transactions were performed. This restoration can be accomplished by, for example, adding the data servers that were offline back into the active-active system by synchronizing them to the current state of the common database (which was not affected by the malicious attack due to the activation of a delayed database). By delaying replication of data transactions, the effect of a data destructive attack relative to the detection time can be reduced or eliminated.

Malicious and/or unintended data transactions may be detected, for example, by analyzing data transactions according to a set of criteria specified in a security policy. The set of criteria may indicate factors indicative of anomalous data activity, which is inconsistent with normal operation. Factors may include, for example, type of data transaction, size of data transaction, frequency of data transactions, historical pattern of data transactions, and/or authentication metrics of a user initiating the data transaction (e.g., identifier, password, biometrics, and/or geographic location). In some implementations, a malicious data transactions is detected when the analyzed factors match a first signature specified in the security policy. A signature may specify, for example, quantized values or ranges of values for one or more of the factors. In some implementations, unintended data transactions may be detected when the analyzed factors match a second signature specified in the security policy that is indicative of an accidental delete. Additionally or alternatively, an attack may be detected when a weighted sum of quantized values of the set of factors exceeds a risk threshold. Weightings for each factor may be specified, for example, in the security policy.

Additionally or alternatively, data transactions may be analyzed to determine risk of unauthorized or suspicious activity prior to repeating data transactions at one or more secondary data servers that are real time/active and available for use by ender user nodes. By performing analysis prior to repeating the data transaction at all of the data servers, suspicious activity can be detected and remedied before it is replicated to each of the databases. In some implementations, a data transaction is analyzed based on factors specified in a security policy to determine a level of risk posed by a data transaction. The level of risk may be determined, for example, based on a weighted sum of quantized values of the set of factors. In some implementations, the level of risk may be determined based on an evaluation of different factors, weightings, and/or algorithms than that used to detect a malicious attack. In some embodiments, a data transaction can be prevented at a secondary data server when the determined level of risk exceeds a threshold level specified in the security policy. The prevented transaction can be flagged for authorization by an administrator, a security program, a user, and combinations thereof. If the transaction is authorized, it can then be carried out along with any other transactions that have been queued in the meantime. It is recognized that when a transaction is prevented from proceeding, the corresponding database(s) can lose synchronicity with the other data servers to the extent that other servers are allowed to process the transaction. To accommodate this, users of the replicated database can be temporarily redirected to the still active data server or notified that transactions are temporarily being queued. In some instances, different secondary data servers can have different threshold levels. This allows for some data servers to continue to process transactions and remain active while the questionable transaction(s) are awaiting authorization. Users assigned to a data server with prevented transactions can be switched to active data servers until authorization is completed. For example, one secondary data server may replicate low and medium risk data transactions, while another may prevent medium risk while still replicating low risk data transactions. Alternatively or additionally, in some implementations, a level of risk may be determined differently for different secondary data servers. For instance, the security policy may specify respective sets of criteria (e.g., factors, weightings, and/or algorithms) for determining risk for each secondary data server. As an illustrative example, a limited risk assessment may be performed before a data transaction is performed at a first secondary data server and a more comprehensive analysis may be performed before the data transaction is performed at a second secondary data server. This allows for different types of threats to be detected and prevented for specific data servers, while allowing the remaining data servers to continue to be actively used.

In some embodiments, a data transaction is prevented from being replicated until the data transaction has been verified/authenticated. In some implementations, verification may only be required if the determined risk level exceeds a certain threshold (e.g., a high-risk data transaction). Verification may include, for example, authentication of the user and/or authorization of the data transaction by the user. For example, a user node that initiates a prevented transaction can be required to submit (additional) authentication information before the prevented transaction is allowed to complete.

In some implementations, the evaluation of data transactions, (e.g., by a data replication manager) may include the cross correlation of data acquired on the data transactions with data from one or more secondary data sources. Secondary data sources may include, for example, network devices, internet-connected data repositories, and/or third-party data subscription services. For example, the calculation of a data threshold for data transactions can include a historical analysis of data transactions as well as information about network traffic or other data that is not directly linked to the data transactions themselves. In certain embodiments, a data replication manager may be configured to receive signatures of an attack from a secondary data source. These signatures can specify problematic data transaction patterns, which can also be correlated with secondary data, and the signatures can be dynamically updated. For instance, a centralized authority can be configured to maintain, update, and distribute signatures to replication managers. As another example, an attack may be detected based on analysis of a first database transactions performed at the initial data server and operations of another data server in the network that processes a second database transactions.

In some embodiments, the criteria (e.g., factors, weightings, and/or algorithms) indicated in the security policy may be determined or adjusted using a machine learning algorithm (e.g., an evolutionary algorithm). The machine learning algorithm may evaluate and adjust a set of criteria in a training process to create a set of criteria to improve performance and/or accuracy of algorithm. Training may include supervised learning, which manually assesses performance or selects modifications, or may include unsupervised learning, which automatically assesses performance of different variations of the criteria. In some implementations, the machine learning algorithm may be configured to continue to adjust the criteria based on accuracy of data transactions identified as high risk. For example, data transactions may be evaluated using a current set of criteria and also with one of more variations of the set of criteria. If a variation of the criteria outperforms the current criteria for a threshold number of data sets, the variation may be selected to be used as the current criteria.

In some embodiments, the data replication manager is configured to provide alert messages to one or more users in response to evaluation of the data metrics satisfying a set of alert criteria specified in the security policy. For example, the alert criteria may be set to trigger alert of a network manager if analysis of data transactions indicates a high-risk of a data destructive attack. In some implementations, the alert messages may include a mechanism for a recipient to select one or more actions to be performed. For instance, the alert can be a screen pop window that includes clickable options: to block and/or reverse a data transaction, to authorize the data transaction, or to perform more comprehensive analysis.

The data replication manager or other processing circuit is configured to provide a graphical user interface (GUI) that may be used to define or adjust risk assessment criteria and/or alert criteria specified in the security policy. The GUI may provide mechanisms to adjust risk assessment criteria (e.g., factors, weightings, and/or algorithms) globally for all secondary data servers or for individual secondary data servers.

Turning now to the figures, FIG. 1 shows a computing arrangement 100 configured for monitoring replicated data transactions for a common database of a plurality of data servers, consistent with various embodiment of the present disclosure. The computing arrangement 100 includes N data servers 110, 120, and 130 configured to provide a common database that can be used by at least application that is used by a plurality of end-user nodes (or just "end users") 150 and 152. The end-user nodes can access the system via one or more network(s) 140. Each of the N data servers 110, 120, and 130 can store a respective version of a common databases 112, 122, and 132, at least some of which can then be used by the remote service. The computing arrangement 100 includes a data replication manager 102 configured to receive records indicative of modifications performed on a version of the data set (e.g., 112) stored in the initial data server. The data replication manager 102 can be configured to monitor and control replications of data transactions initiated on an initial data server (e.g., 110). By comparing data relating to the monitored data transactions to a security profile, the data replication manager 102 can determine whether the data transitions that result in modifications to the common database should be allowed or prevented from being performed in one or more of the secondary data servers (e.g., 120 and 130). The replication criteria in the security profile 104 can be configured to restrict replication of modifications to reduce the likelihood that a malicious modification will be performed in all data servers.

In certain embodiments, at least some of the data servers 110, 120, and 130 can be configured to operate as an active-active (real time) replication system that allows end users 150 and 152 access to the corresponding databases through one or more common application(s). For instance, data replication manager 102 can be configured to maintain synchronicity between, some, or all, of the databases 112, 122, and 132. The manner in which the data replication manager 102 maintains the synchronicity can vary according to the specific configuration of the system. For instance, the data servers 110, 120, and 130 can be configured as network attached storage devices (NAS). Each transaction for the common database can therefore be replicated before transmitting it using the network(s) 140. In some instances, data replication manager 102 can be configured to perform asynchronous real time replication of the transactions. For example, if a transaction is received at any of the data servers, that data server functions as the initial server. The data replication manager 102 can be configured to then generate replicated transaction requests for the secondary data servers. Coordination of the transactions can ensure the databases are properly synchronized (e.g., through the use of transaction locking mechanisms).

In some embodiments, the data replication manager 102 is configured to delay replication of modifications for different length of time specified for the data servers in the security profile 104. The data replication manager 102 can be configured to store records of modifications performed by the initial data server 110 in a buffer or queue. A modification initially performed at the initial data server 110 may be performed in a first secondary data server (e.g., 120) after a first length of time specified in the security profile. The modification may also be performed in a second secondary data server (e.g., 130) after a second length of time specified in the security profile. In certain implementations, there can be a set of multiple data servers that are synchronized in real time. As used herein, real time describes the situation where the delay is kept small enough so that the respective databases are each actively available for the end user nodes and thereby indistinguishable from the perspective of the common application and end user nodes. One or more additional sets of the data servers can then implement one or more different delays. For example, a set of 50 data servers may be configured as real time active-active servers that provide load balancing and high availability to the common database. A smaller set of five servers can also be configured to provide replication of the common database according one or more different delay periods. For implementations where the real time status of the database is important, the set of delayed servers may represent additional overhead. This overhead is present when the delayed servers are not synchronized in real time and are therefore not be actively and directly used by the common application. This overhead, however, can scale well as the size of the active-active database servers grows. Moreover, the use of delayed servers can be useful for providing protection in the form of one or more replicated servers that can be transition from a delayed status to an active status based upon a state of the common database some point in the past. This can allow for a larger time window during which the detection of the malicious activity can be accomplished with a gracefully recovery.

According to certain embodiments, when a delayed data server is made active, the queued/delayed transactions can be purged so as not to replicate the malicious transactions that were detected as having occurred with the active data servers. In some implementations, the queued transactions can be selectively purged, allowing some transactions to be completed. This may include the use of data transactions authorization mechanisms discussed herein. In some instances, the data replication manager 102 can be configured to automatically identify of the transactions that resulted in the detection of the malicious activity. The identified transactions can then be required to be authorized or automatically purged. In particular embodiments, the identification of the malicious activity can be based upon a point in time at which the earliest malicious activity was detected.

Additionally or alternatively, the data replication manager 102 can be configured to monitor and control the replication of data transactions to active data servers. For instance, the data replication manager 102 may determine a level of risk posed by a modification prior to replicating the modification at one or more secondary data servers. The data replication manager 102 can be configured to determine the level of risk by evaluating modifications using a replication criteria specified in the security policy. A level of risk posed by a modification may be determined based on a set of factors in the replication criteria that are indicative of anomalous data activity. In some implementations, the data replication manager 102 is configured to perform the modification in each secondary data server in response to the determined level of risk being less than or equal to a threshold risk-level specified for the secondary data server in the security policy.

In certain embodiments, a separate instance of a data replication manager 102 can be located at each of the data servers 110, 120, and 130. Each instance can perform monitoring and control over the corresponding replicated transactions. In certain implementations, the different instances of the replication manager might be configured identically, or they can have differences. The differences might include the use of transaction delays, different threshold levels, different security profiles, and combinations thereof.

Figure 2:
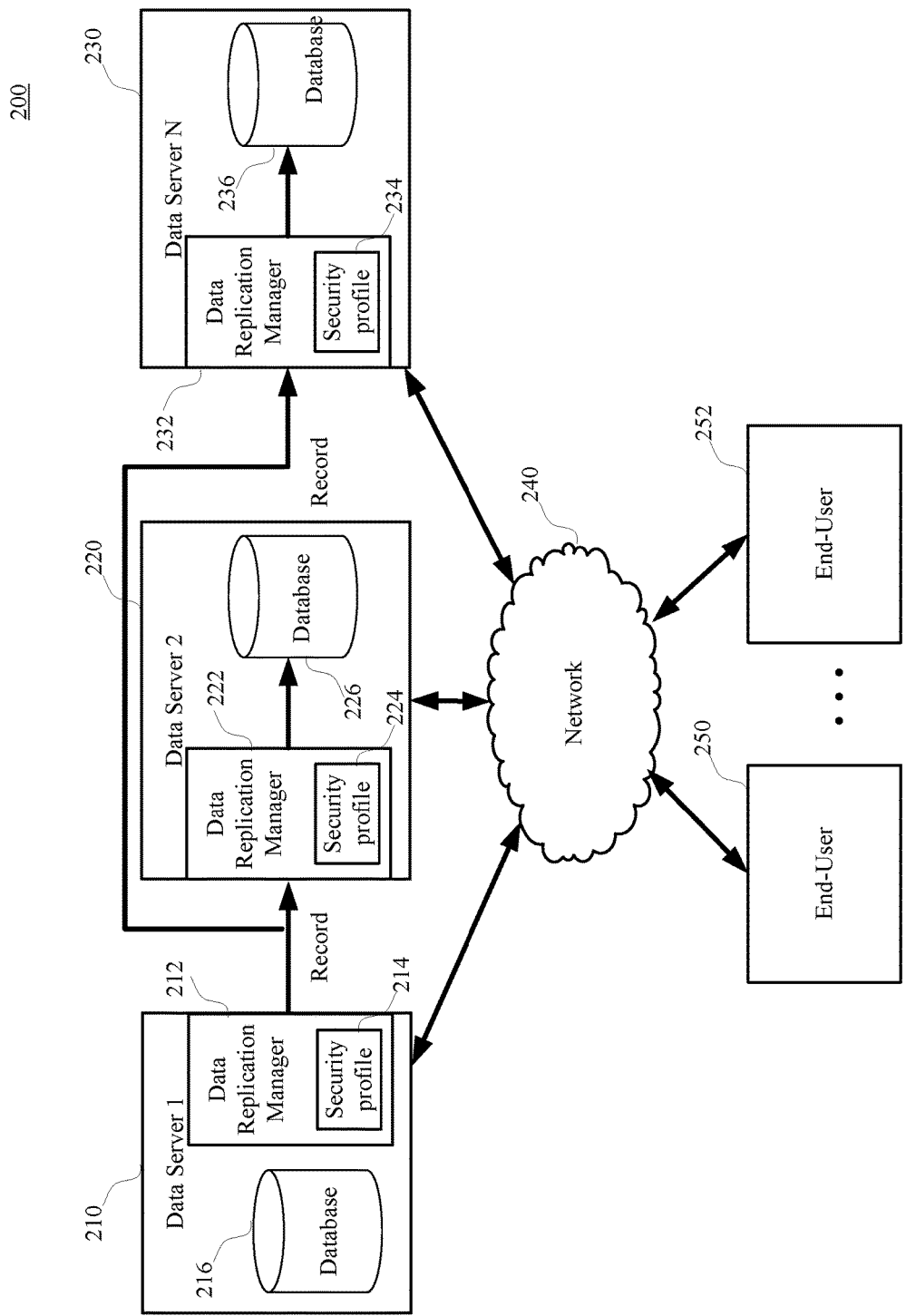
FIG. 2 shows a computing arrangement having a multiple instances of data replication managers for managing replication of modifications in various data servers, consistent with various embodiment of the present disclosure.

FIG. 2 shows a computing arrangement having a multiple instances of data replication managers for managing replication of modifications in various data servers. The computing arrangement 200 can include N data servers 210, 220, and 230 configured to provide a common database that can be used by at least one application that is used by a plurality of end-user nodes (or just "end users") 250 and 252. Each of the data servers can be configured to store a respective version 216, 226, and 236 of a database used for providing the remote service to the end-users 250 and 252. In this example, the secondary data servers (e.g., 220 and 230) each include a respective data replication manager 212, 222, and 232 configured to replicate modifications performed in an initial data server 210, 220, and 230, respectively and according to replication criteria specified in a security profile 214, 224, and 234. In this example, the data replication manager 212 in an initial data server (e.g., 210) provides a record of a modification to data replication managers 222 and 232 in the secondary servers 220 and 230.

The replication criteria indicated in the security profile 224 and 234 can be configured to cause the data replication managers 222 and 232 to detect malicious attacks and in response restrict replication of corresponding modifications to protect the secondary data servers from malicious modifications. As described with reference to FIG. 1, replication of modifications may be restricted by delaying performance of modifications in at least some of the secondary data servers 220 or 230 for a respective length of time indicated for the secondary data server 220 or 230 in a security profile 224 or 234. As further described with reference to FIG. 1, performance of modifications may additionally or alternatively be restricted according to a level of risk that the modification is malicious.

According to various embodiments, the data servers can be initially configured in a standard active-active configuration where they each function in real time without an intentional delay, such that they are all accessible to end user nodes. If a data replication manager detects a threat level that exceeds a first threshold, one or more of the data servers can be reconfigured to queue transactions according to a set delay time. If subsequent analysis determines that the initial detection was a false alarm, the delayed servers can be configured for real time operation by implementing the queued transactions. The (previously) delayed servers can then be used as part of the active-active replication architecture. If subsequent analysis determines that the initial detection was valid, then the delayed servers can be used to recover from the malicious modifications.

Figure 3:
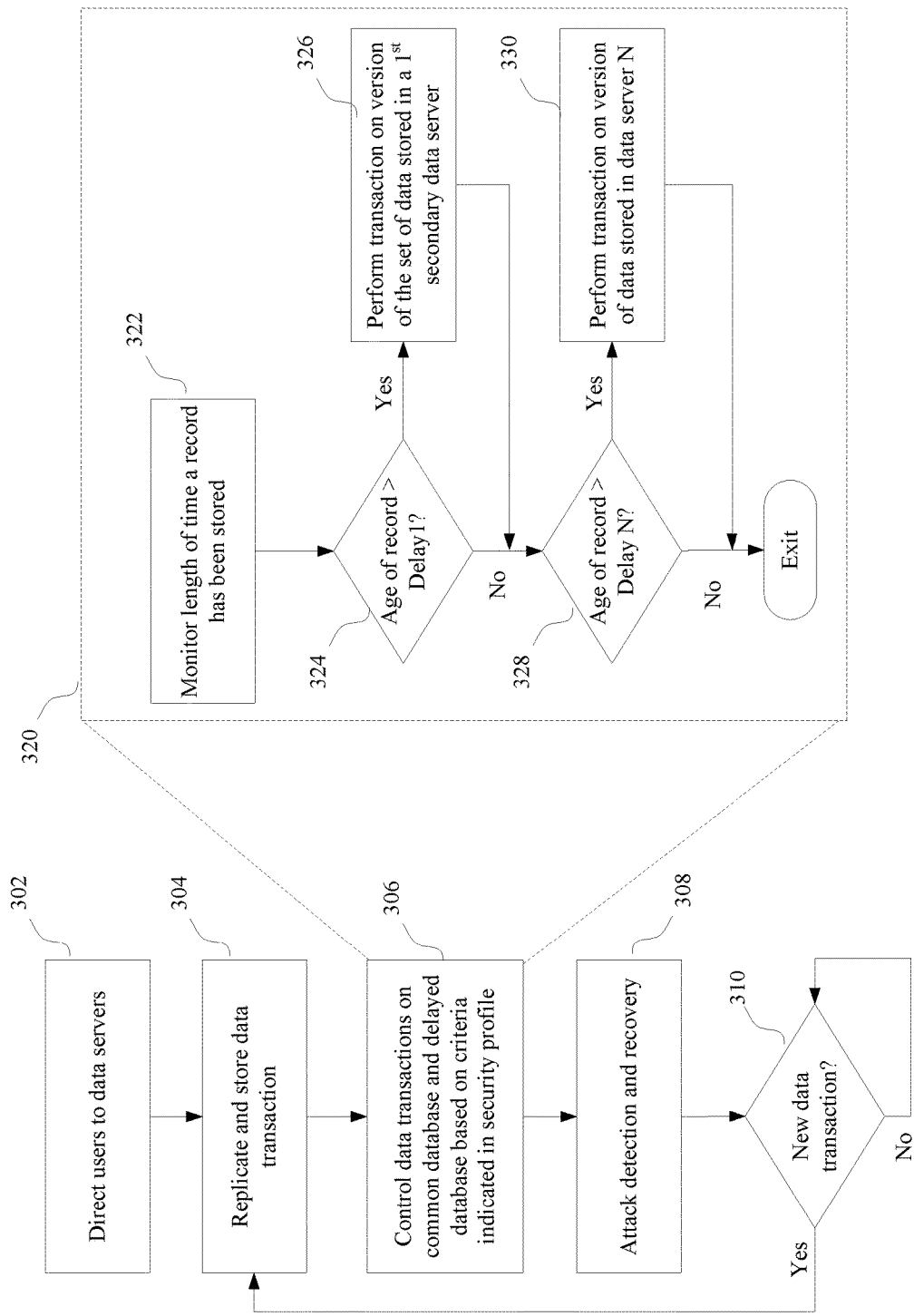
FIG. 3 shows a process for replication of a database between servers of a plurality of data servers, consistent with various embodiment of the present disclosure.

FIG. 3 shows a process for controlling transaction replication for a common replicated database, consistent with various embodiment of the present disclosure. The process depicted in FIG. 3 allows for different delay periods to be used for the replication of the different data transactions. Initially, user nodes can be directed to a data server of the plurality of data servers, as shown by block 302. For example, there may be set of N data servers that are part of an active-active replicated system that supports a common application. When a user node attempts to access the database through the common application, the user node can be assigned to a particular data server. The assignment can be based upon load balancing, physical locations, and other possible considerations.

When a user node uses the common application in a manner that results in a data transaction, a data replication manager can monitor and control the replication of the data transaction for each of the data servers, as shown by block 304. This replication can According to some embodiments, there can be set of data servers that are actively used by the common application. These data servers can process the data transaction in real time so long as the data transaction has not been identified as problematic relative to the security profile, as indicated in block 306. If a data replication manager indicates that a transaction is problematic, the transaction can be prevented from being replicated on one or more of the active data servers. In some instances, the data transaction can be flagged for review and authorization, whether by an automated security program, an operator of the system, or both. If authorized, then the data transaction can be carried out. If not, then appropriate action can be taken, e.g., discarding the transaction relative to the secondary servers while undoing the transaction on the initial server or containing the source of the malicious data transaction by denying subsequent access to a particular user node.

Block 320 shows an example process for performing delayed modifications at secondary data servers based on criteria indicated in a security profile. In this example, performance of a modification at secondary data servers is delayed by respective lengths of time. At block 322, the length of time that each record has been stored is monitored. A respective delay is specified for each secondary data server in the plurality of data servers in a security policy. For each secondary data server, the process performs the modification on a version of the database stored in a particular secondary data server after the record for the modification has been stored for a length of time equal to the delay specified for the secondary data server in the security policy. For example, if a record has been stored for a length of time greater than a delay (delay1) specified for a first secondary data server in a security profile, decision block 324 directs the process to block 326. At block 326, the modification indicated by the record is performed on a version of the database stored in the first secondary data server. If a record has been stored for a length of time greater than a delay (delayN) specified for an Nth secondary data server in a security profile, decision block 328 directs the process to block 330. At block 330, the modification indicated by the record is performed on a version of the database stored in the Nth secondary data server.

Block 308 shows that an attack detection and recovery process can be performed. This detection can occur at any point during the depicted process, and the transactions can be prevented if a corresponding risk level is exceeded. This may lead to the currently active servers being brought offline while one of the delayed set of servers are made active, effectively rolling back the common database to a time period of the corresponding delay. A malicious attack may be detected by analyzing modifications for a set of factors in the security profile indicative of anomalous data access activity contrary to normal operation. As previously described, by delaying performance of modifications at blocks 326 and 320, there is more time for detection of an attack at block 308 before all versions of the database have been modified. In response to a new modification performed at the initial data server, decision block 310 directs the process back to block 304.

Figure 4:
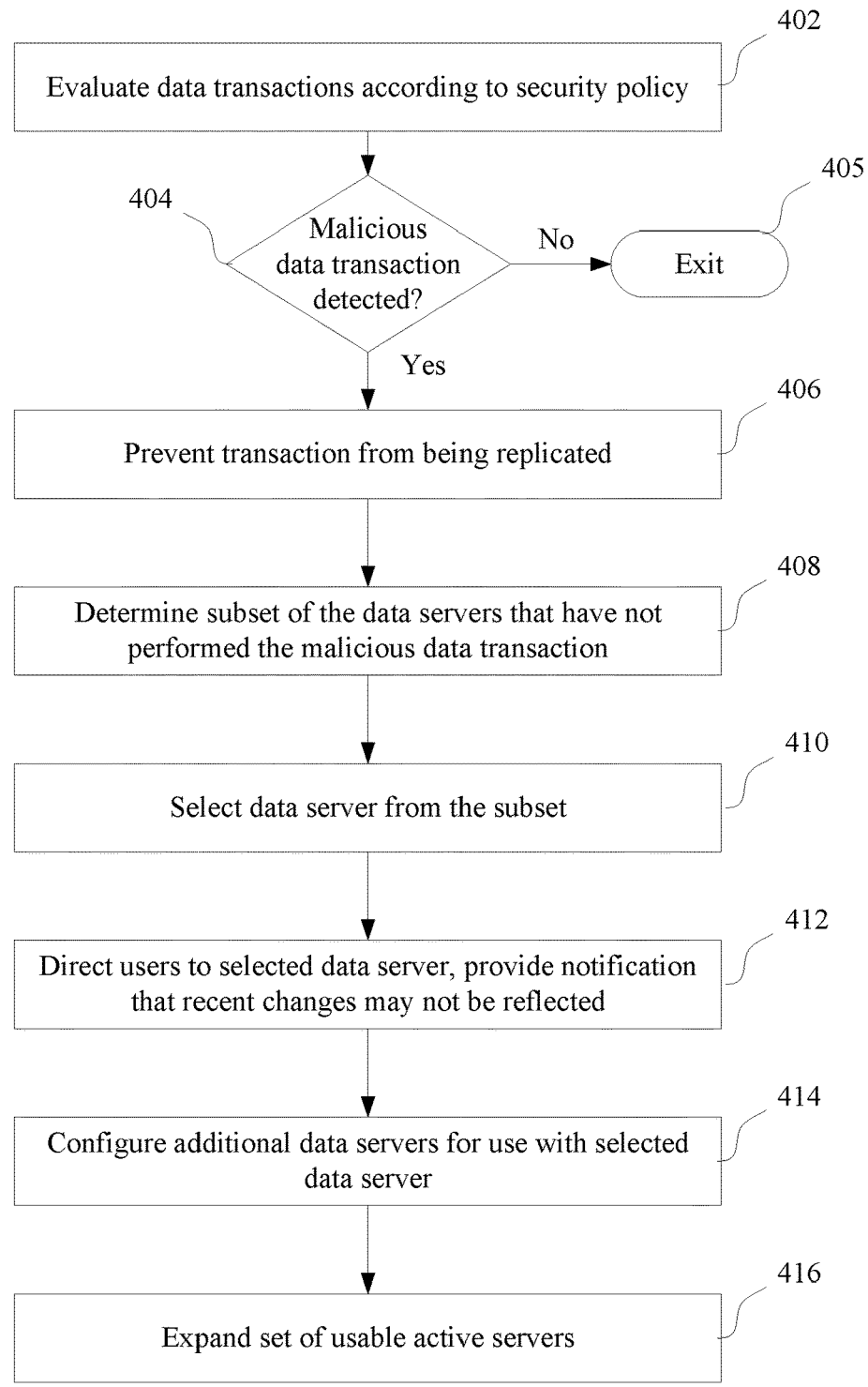
FIG. 4 shows a process for detection of and recovery from a data destructive attack, consistent with various embodiment of the present disclosure.

FIG. 4 shows a process for detection of and recovery from a data destructive attack, consistent with various embodiment of the present disclosure. At block 402, a data replication manager can evaluate buffered transactions, according to set of factors in a security profile to detect malicious modifications. In some implementations, each modification may be evaluated for a number of factors indicative of anomalous data activity. Factors may include, for example, size of data transactions, frequency of data transactions, historical pattern of data transactions, and/or authentication metrics of a user initiating the data transaction.

According to certain embodiments, the security profile can be based upon one or more baselines for data transactions. The baselines can represent the expected level and type of data transactions. For instance, one baseline may indicate the amount data transactions expected for a particular day and time. The baseline can specify the type of data transactions by their type. For example, the baseline may indicate that deletions from the database are expected to occur at a particular rate or frequency, and this particular frequency may also vary during the day, week, month or year. The risk level for the data transactions can be determined, as least in part, based upon a deviation from the baseline. For example, a threshold may be exceeded when the actual rate of deletion-based data transactions exceeds the baseline by 10%.

Consistent with some embodiments, the security profile can look for data transactions that match a particular profile relative to factors such as timing, rate, access type, and source for the data transactions. For example, the security profile can analyze a database transaction from a particular user node, or particular set of user nodes, by comparing the data transactions to a known data transaction profile that corresponds to prior malicious attacks. This might include, for example, a set of modifications that occur at specific time intervals, relative to a certain data locations or other factors that can be monitored. In such an instance, a threshold level might be exceeded when the monitored data transactions match one of the malicious profiles to within a specific percentage.

In certain embodiments, the system can use a malicious profile that correspond to a modifications that occur over a long period of time, and thus, the modifications might be spread out over sufficient time that they do not exceed an expected deletion rate by a threshold amount. The data replication manager can be configured to aggregate data transactions that occur over a period of time to determine whether or not the data transactions collectively exceed a threshold level. For example, the security profile might specify that transactions emanating from user nodes that exhibit certain characteristics should be more carefully monitored. The characteristics might include the geographic location of the user node, and deviations from prior node activity. In response to detecting such characteristics, the data replication manager can be configured to store a transaction history for the user node (or group of user nodes) and to aggregate the data transactions to determine if a corresponding threshold level for data transactions has been exceeded.

If no malicious modifications are detected, per decision block 404, the data replication manager can exit the process to exit, as indicated by block 405. If a malicious modification is detected, the data replication manager can prevent the modification from being replicated on secondary data servers, per block 406.

For embodiments in which there are data servers configured to function as delayed replication databases, the system can identify a subset of the data servers that are available for use in recovery from the malicious modifications, as indicated by block 408. For example, the system may identify the time at which the first malicious modification occurred. The system can then correlate this time to the delay times for the various delayed data servers in order to identify the subset of available data servers.

At block 410, the system can select one or more data servers from the determined subset from block 408. In some instances, this might be the most up-to-date data server of the subset. In some instances, the system may not know the precise timing for when the malicious modifications first occurred. In some embodiments, the system could provide a list of available servers to an administrator who could select the appropriate server. The system could also be configured to determine a probability distribution that represents the likely time at which the malicious modifications began. The system can be configured to select a server that meets a minimum probability of not having data subject to malicious modifications.

According to certain embodiments, queued data transactions for a selected server can be discarded so as not to carry out queued malicious modifications. In some embodiments, the system can be configured implement queued transactions that were queued prior to a point at which the malicious modifications began, or a point time at which the queued malicious transactions were most likely to have begun. This allows for a more precise control over the recover point of the delayed server, e.g., effectively rolling the recover point forward in time by implementing some of the queued data transactions.

At block 412, the system can be configured to direct users to the selected data server(s), which have been made active. In some implementations, a notification may be provided to the users, at block 412, indicating that recent changes may have been lost. For example, the notification may indicate the amount of time during which data transactions were lost.

It is recognized that after switching to the selected servers, the number of active servers may be significantly smaller than before the switch. For example, a system may have a large number of data servers that are updated in real time, while having a relatively small number of delayed data servers. This disparity may be due to a desire to have a low overhead for implementing the delayed servers. In other words, during normal operation, it can be desirable to have as much of the computer resources dedicated to active use as possible. Moreover, the relative capabilities of the delayed servers may be less. Accordingly, the system can be configured to begin configuring additional data servers for inclusion into the set of active data servers, as indicated by block 414. This can include synchronizing a database of one or more of the previously active servers affected by the malicious modifications with the currently active common database that is being used by the end user nodes.

Once additional data servers are properly synchronized, the system can begin directing users to the additional data servers, per block 416.

Figure 5:
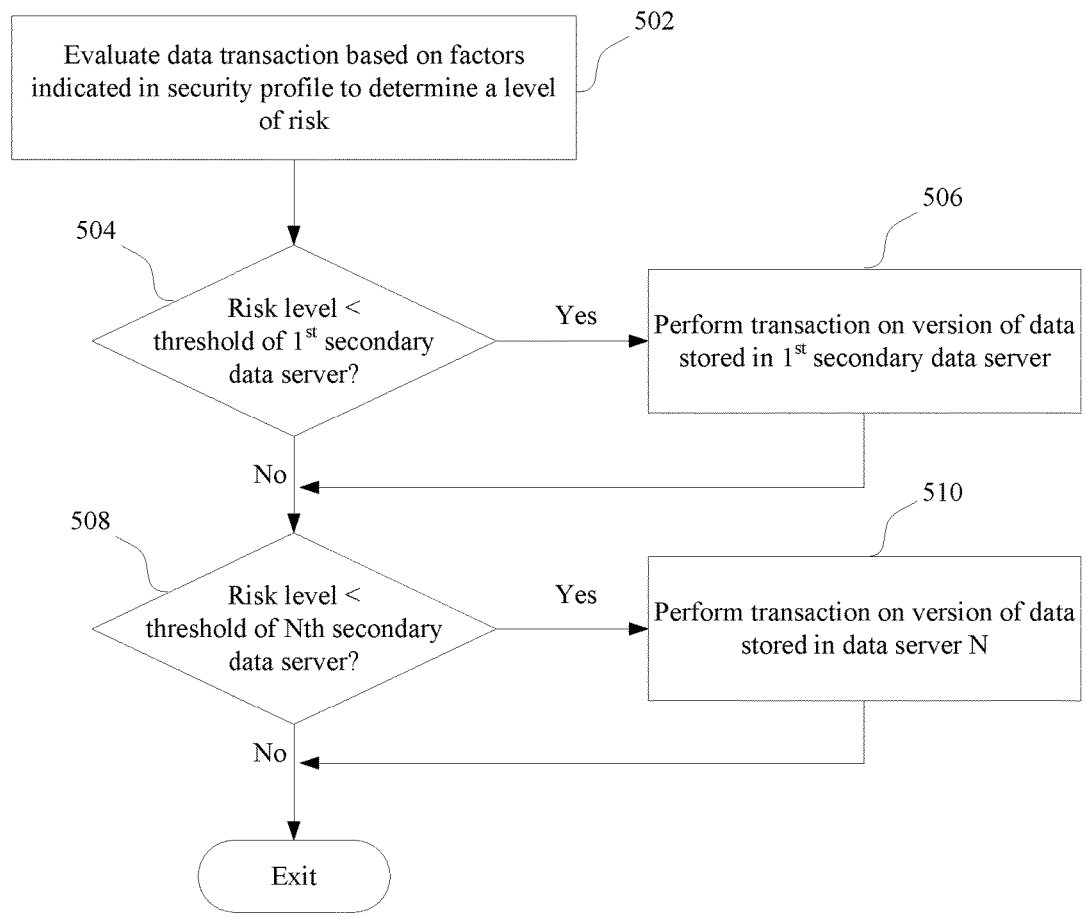
FIG. 5 shows a process for replicating modifications at data servers based on criteria indicated in a security profile, consistent with various embodiment of the present disclosure.

FIG. 5 shows an example process for performing modifications at secondary data servers based on criteria indicated in a security profile. The process may be performed, for example at block 306 in FIG. 3 in addition to or in lieu of the process shown in block 320. At block 502, modifications are evaluated based on factors in a security profile to determine a level of risk posed by each modification. The security profile also includes a respective risk threshold for each of the secondary data servers. If a determined level of risk for a modification is less than the threshold for a secondary data server, the modification is performed on the version of the data stored in the secondary data server. For example, if the determined level or risk is less than a threshold specified for a first secondary data server, decision block 504 directs the process to block 506. At block 506, the modification indicated by the record is performed on a version of the database stored in the first secondary data server. Similarly, if the determined level or risk is less than a threshold specified for an Nth secondary data server, decision block 508 directs the process to block 510. At block 510, the modification indicated by the record is performed on a version of the database stored in the Nth secondary data server. By preventing performance of higher risk modifications, it is more likely that an uncorrupted version of the data will be available in one or more of the secondary data servers when attack is detected.

In some embodiments, multiple levels of analysis may be performed before determining whether or not a modification should be performed at a secondary data server. For example, a process may perform an additional more comprehensive analysis in response to an initial analysis indicating a high level of risk.

Figure 6:
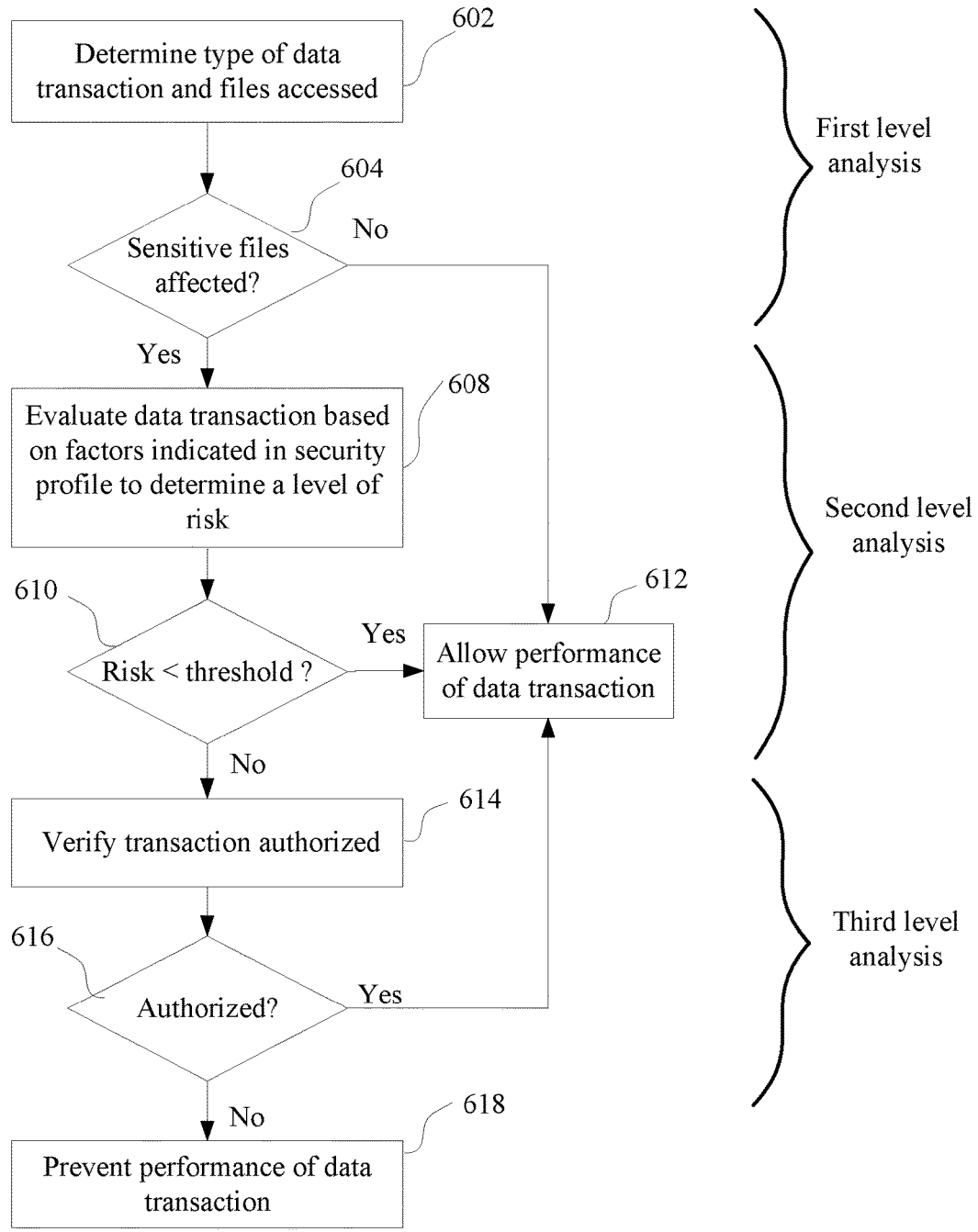
FIG. 6 shows a process for replicating modifications at data servers based on criteria indicated in a security profile, consistent with various embodiment of the present disclosure.

FIG. 6 shows an example process for performing modifications at a secondary data server using a multi-level analysis based on criteria indicated in a security profile. The process may be performed, for example at block 306 in FIG. 3 in addition to or in lieu of the processes shown in block 320 of FIG. 3 and/or in FIG. 5. In this example, the process performs three levels of analysis. In a first level of analysis, the process determines whether a data transaction modifies sensitive data files. At block 602, files modified are determined. In some implementations, sensitive files are identified in the security policy, for example, by name, directory, memory address, and/or file type. If the modification does not affect a sensitive file, decision block 604 directs the process to block 612. At block 612, the process allows the modification to be performed at the secondary data server at block 612. Otherwise, the process proceeds with a second level of analysis.

In this example, the second level of analysis is a risk-based analysis similar to that described with reference to FIG. 5. At block 608, the modification is evaluated based on factors in a security profile to determine a level of risk posed by the modification. If a determined level of risk is less than or equal to a threshold specified for the secondary data server in the security policy, decision block 610 directs the process to block 612. At block 612, the process allows the modification to be performed on a version of the database stored at the secondary data server. If the determined risk exceeds the threshold, decision block 610 directs the process to perform a third level of analysis.

In this example, the third level of analysis attempts to verify whether or not the transaction is authorized at block 614. In some implementations, a transaction is verified by authenticating a user that initiated the transaction. A user may be authenticated using various authentication metrics such as user-ID, password, biometrics, device used to submit transactions, graphical location of the user, and/or one time password (e.g., provided via SMS). Alternatively or additionally, the verification process may prompt an authorized user (e.g., a network manager) to authorize the modification. If the process verifies that the transaction is authorized, decision block 616 directs the process to block 612. At block 612, the modification is allowed to be performed on a version of the database stored at the secondary data server. If the process cannot verify that the transaction is authorized, the modification is prevented from being performed at the secondary data server at block 618.

Various blocks, modules or other circuits may be implemented to carry out one or more of the operations and activities described herein and/or shown in the figures. In these contexts, a "block" (also sometimes "circuit", "logic circuitry", or "module") can be implemented using a circuit that carries out one or more of these or related operations/activities. In various embodiments, a hard-wired control block can be used to minimize the area for such an implementation in case a limited flexibility is sufficient. Alternatively and/or in addition, in certain of the above-discussed embodiments, one or more modules are discreet logic circuits or programmable logic circuits configured and arranged for implementing these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. An apparatus for providing protection for a plurality of data servers configured to provide data replication for a database, the apparatus comprising:
at least one processing circuit, including a programmed computer, configured to:
receive a record that specifies a possibly malicious modification performed on a first version of the database stored on a first data server of the plurality of data servers;
delay replication of the modification indicated by the record in at least a second data server of the plurality of data servers for a length of time specified for the second data server in a security profile, wherein the length of time is set at least in part in response or relative to receipt of the record that specifies a possibly malicious modification;
during the length of time in which replication is delayed, determine a probability that the modification indicated by the record is malicious based on respective quantizations of a first set of factors indicated in a security profile, the respective quantizations collectively exceeding a threshold level which is indicative of anomalous data access activity; and
prevent replication of the modification indicated by the record on a second version of the database stored in the second data server in response to the threshold level being exceeded.

2. The apparatus of claim 1, wherein the at least one processing circuit is further configured to delay replication of the modification indicated by the record in a third data server of the plurality of data servers for a length of time specified for the third data server in the security profile, wherein the length of time specified for the third data server is greater than the length of time specified for the second data server.

3. The apparatus of claim 1, wherein the at least one processing circuit is configured to assess whether the respective quantizations collectively exceed the threshold level by summing values corresponding to the quantizations, wherein the first and second data servers are configured to provide data replication that includes data replication for the modification unless prevented by the at least one processing circuit in response to the threshold level being exceeded.

4. The apparatus of claim 1, wherein the at least one processing circuit is further configured to assess whether the respective quantizations collectively exceed the threshold level by comparing a representation of the respective quantizations to the threshold level.

5. The apparatus of claim 1, wherein the at least one processing circuit is configured and arranged to
store records indicating respective modifications performed on the first version of the database; and
in response to one of the records being stored for a second length of time specified for a third data server in the security profile, perform one of the modifications on a third version of the database stored in the third data server.

6. The apparatus of claim 1, wherein the at least one processing circuit is further configured and arranged to:

determine a risk level of the modification indicated by the record based upon the first set of factors indicated in a security profile, the first set of factors being indicative of anomalous data access activity;

perform the modification indicated by the record on the second version of the database in response to the risk level being less than the threshold level; and prevent the modification indicated by the record from being performed on the second version of the database in response to the risk level being greater than or equal to the first threshold level.

7. The apparatus of claim 6, wherein:

the first set of factors in the security profile includes a historic profile for the modifications; and the at least one processing circuit is further configured to determine the risk level based on deviations from the historic profile.

8. The apparatus of claim 1, wherein the at least one processing circuit is further configured and arranged to:

determine a risk level of the modification indicated by the record based upon a second version of the first set of factors indicated in the security profile;

perform the modification indicated by the record on a third version of the database stored in a third data server of the plurality of data servers in response to the risk level being less than a second threshold level indicated in the security profile; and prevent the modification indicated by the record from being performed on the third version of the database in response to the risk level being greater than or equal to the second threshold level.

9. The apparatus of claim 1, wherein the at least one processing circuit is further configured to provide, to an authorized user, a notification in response to preventing the modification from being performed.

10. The apparatus of claim 1, wherein the respective quantizations correspond to weighting assigned to the respective ones of the first set of factors.

11. A method for providing protection for a plurality of data servers configured to provide data replication for a database, the method performed by a processing circuit including a CPU and comprising:

receiving a record that specifies a possibly malicious modification performed on a first version of the database stored on a first data server of the plurality of data servers;

delaying replication of the modification indicated by the record in at least a second data server of the plurality of data servers for a length of time specified for the second data server in a security profile, wherein the length of time is set at least in part in response or relative to receipt of the record that specifies a possibly malicious modification;

during the length of time in which replication is delayed, determining a probability that the modification indicated by the record is malicious based on respective quantizations of a first set of factors indicated in a security profile, the respective quantizations collectively exceeding a threshold level which is indicative of anomalous data access activity; and preventing replication of the modification indicated by the record on a second version of the database stored in the second data server in response to the probability exceeding a threshold level specified in the security profile.

12. The method of claim 11, wherein the processing circuit operates to delay replication of the modification indicated by the record in one server of the plurality of data servers for a length of time which is specified for the one server in the security profile relative to a length of time specified for another of the plurality of data servers.

13. The method of claim 11, wherein the processing circuit operates to assess whether the respective quantizations collectively exceed the threshold level by summing values corresponding to the quantizations, wherein the first and second data servers are configured to provide data replication that includes data replication for the modification unless prevented by the processing circuit in response to the threshold level being exceeded.

14. The method of claim 11, wherein the processing circuit operates to assess whether the respective quantizations collectively exceed the threshold level by comparing a representation of the respective quantizations to the threshold level.

15. The method of claim 11, wherein the processing circuit operates to store records indicating respective modifications performed on the first version of the database; and in response to one of the records being stored for a second length of time specified for a third data server in the security profile, perform the modification indicated by the record on a third version of the database stored in the third data server.

16. The method of claim 11, wherein the processing circuit operates to:

determine a risk level of the modification indicated by the record based upon the first set of factors indicated in a security profile, the first set of factors being indicative of anomalous data access activity;

perform the modification indicated by the record on the second version of the database in response to the risk level being less than the threshold level as indicated in the security profile; and prevent the modification indicated by the record from being performed on the second version of the database in response to the risk level being greater than or equal to the threshold level.

17. The method of claim 11, wherein the processing circuit operates to:

determine a risk level of the modification indicated by the record based upon a second version of the set of factors indicated in the security profile;

perform the modification indicated by the record on a third version of the database stored in a third data server of the plurality of data servers in response to the risk level being less than another threshold level indicated in the security profile; and prevent the modification indicated by the record from being performed on the third version of the database in response to the risk level being greater than or equal to the other threshold level.

18. The method of claim 11, wherein the processing circuit operates to provide, to an authorized user, a notification in response to preventing the modification from being performed.

19. The method of claim 11, wherein:

the first set of factors in the security profile includes a historic profile associated with the modification; and the processing circuit further operates to determine the risk level based on deviations from the historic profile.

20. The method of claim 11, wherein the respective quantizations correspond to weighting assigned to the respective ones of the first set of factors.

* * * * *